US008046460B1

(12) United States Patent
Greenidge et al.

(10) Patent No.: US 8,046,460 B1
(45) Date of Patent: Oct. 25, 2011

(54) AUTOMATIC SERVER DEPLOYMENT USING A PRE-PROVISIONED LOGICAL VOLUME

(75) Inventors: Charles S. Greenidge, Loveland, CO (US); Nigel Cook, Boulder, CO (US); Charles L. Hudson, Round Rock, TX (US); Alexander Kramer, Frisco, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 12/358,317

(22) Filed: Jan. 23, 2009

(51) Int. Cl.
*G06F 15/173* (2006.01)

(52) U.S. Cl. .......................... 709/225; 709/226; 709/217

(58) Field of Classification Search .......... 709/225–226, 709/220, 217, 223
See application file for complete search history.

(56) References Cited

U.S. PATENT DOCUMENTS

| | | | |
|---|---|---|---|
| 6,343,324 B1 * | 1/2002 | Hubis et al. ................... | 709/229 |
| 6,421,711 B1 * | 7/2002 | Blumenau et al. ............ | 709/213 |
| 7,213,065 B2 | 5/2007 | Watt | |
| 2005/0066125 A1 * | 3/2005 | Tanaka et al. ................. | 711/114 |
| 2006/0075217 A1 * | 4/2006 | Takamoto et al. ............. | 713/2 |
| 2006/0253549 A1 * | 11/2006 | Arakawa et al. .............. | 709/217 |
| 2007/0250680 A1 * | 10/2007 | Jokura .......................... | 711/170 |
| 2008/0294888 A1 * | 11/2008 | Ando et al. .................... | 713/2 |
| 2009/0077331 A1 * | 3/2009 | Shibayama et al. .......... | 711/161 |
| 2009/0158081 A1 * | 6/2009 | Dake et al. .................... | 714/3 |

OTHER PUBLICATIONS

Egenera, Inc., "The Egenera Processing Area Network (PAN) Architecture (White Paper)", www.egenera.com, (2002),21 pages.
Topspin Communications Inc., "Topspin VFrame Director User's Guide, Release 2.0", (Mar. 2004),113 pages.

* cited by examiner

*Primary Examiner* — Philip B Tran (57) ABSTRACT

According to one embodiment, a server is automatically deployed using a pre-provisioned logical volume LV. A first world wide name WWN1 is associated 320 with a logical volume LV1 associated with a disk array controller 260. A second world wide name WWN1, which is assigned to a server S1, is received 335 at the disk array controller 260. If 340 the first world wide name WWN1 is the same as the second world wide name WWN1, the server S1 is enabled 350 to access the logical volume LV1. The first and second world wide names are not required to be assigned to any server S1, S2 at the time that the first world wide name is associated with the logical volume.

15 Claims, 3 Drawing Sheets

AUTOMATIC SERVER DEPLOYMENT USING A PRE-PROVISIONED LOGICAL VOLUME

BACKGROUND

The first storage devices were dedicated to a particular computing resource, which may be a server. However, as technology and computing requirements have evolved, servers and the storage that they use are maintained separately and various methods of flexibly assigning storage resources to the servers have been developed. One method of flexibly assigning storage resources employs a pool of storage consisting of logical volumes that may be selected and assigned for a period of time to various servers. A storage administrator configures and maintains the pool of storage resources and a server administrator configures and maintains the servers. The pool of storage resources and the servers shall be referred to herein as "domains." Both administrators are experts with respect to their own domains and they use a separate set of tools and processes for configuring and maintaining their domains.

In order to preserve security and to adequately use their respective areas of expertise, a storage administrator is typically not allowed to perform server administrator tasks and vice versa. Therefore, the storage and server administrators engage in a multi-phase communication in order to deploy servers and provision storage resources for that server. First the server administrator will communicate to the storage administrator criteria for the storage that will be used to deploy a desired set of servers. The storage criteria shall include, among other things, the number of logical volumes, the size of each of the logical volumes, the RAID level, OS host mode, and so on. The storage administrator will prepare and configure logical volumes for the desired operating systems according to the server administrator's storage criteria, such as the size, RAID level, OS host mode, and so on, so that the desired set of servers can be deployed. The configured logical volumes that are used for booting servers shall be referred to as "boot logical volumes." The server administrator will configure the desired set of servers and verify that the desired set of servers can be booted using the configured boot logical volumes. Then the server administrator will communicate to the storage administrator storage criteria that will be used for private non-bootable storage that will contain, for example, application data and so on. The storage administrator will configure logical volumes as the server administrator requested to be used as private non-bootable storage. The logical volumes that are used as private non-bootable storage shall be referred to as "private logical volumes." The server administrator will verify that the servers can access and use the private logical volumes. The server administrator may have to engage in this multi-phase communication with the storage administrator for each server that the server administrator deploys. The multi-phase process of communicating back and forth between the storage and server administrators can take from a few days to several weeks depending on the size of a data center and the data center's protocol for how such communications are to be conducted. This results in a much more frequent interaction between server and storage administrators which in turn reduces the ability of the server administrator to efficiently react to changing business needs within the data center.

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "associating," "receiving," "enabling," "accessing," "assigning," configuring," communicating," selecting," "provisioning," "storing," or the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

Introduction of Discussion

Figure 1:
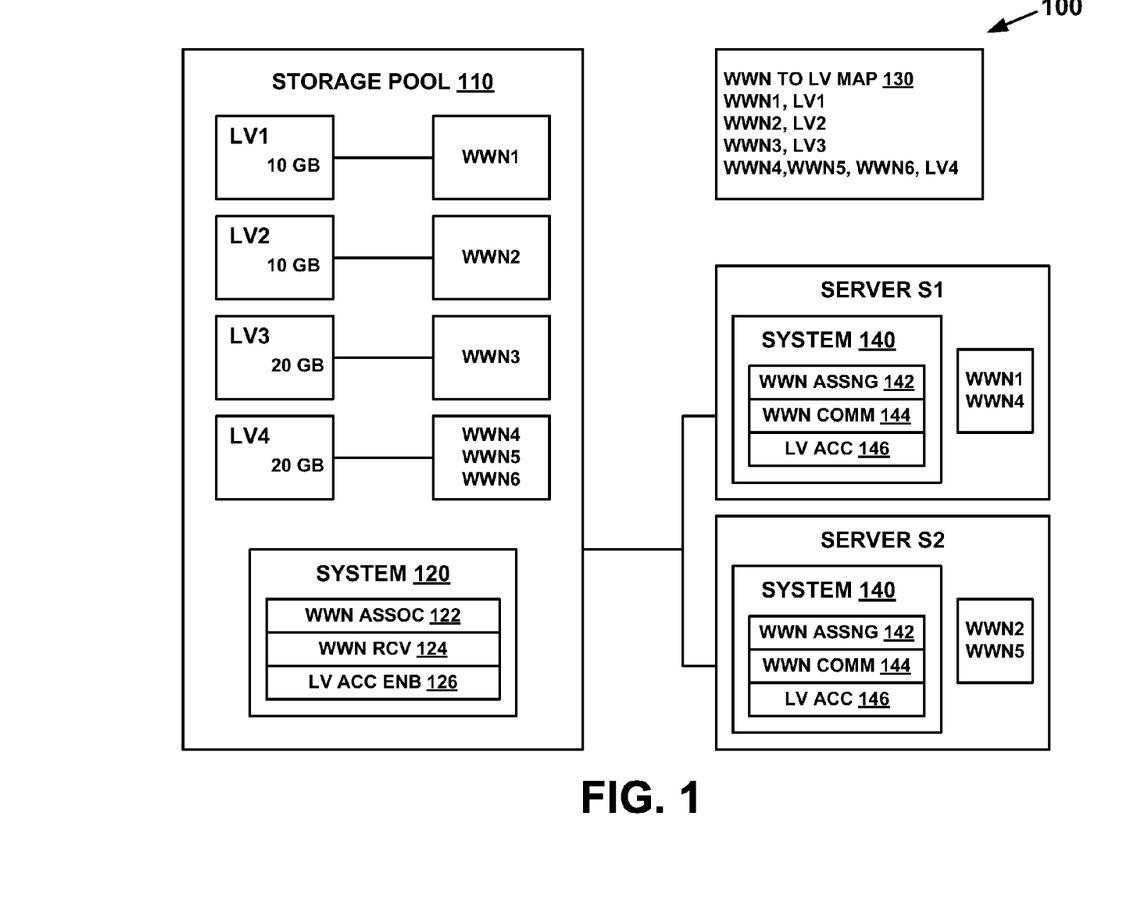
FIG. 1 depicts a block diagram of a system for automatic server deployment using a pre-provisioned logical volume, according to one embodiment.

FIG. 1 depicts a block diagram of a system for automatic server deployment using a pre-provisioned logical volume, according to one embodiment. The blocks that represent features in FIG. 1 can be arranged differently than as illustrated, and can implement additional or fewer features than what are described herein. Further, the features represented by the blocks in FIG. 1 can be combined in various ways. The system 100 can be implemented using software, hardware, firmware, or a combination thereof.

FIG. 1 depicts a storage pool 110 of logical volumes LV1-LV4, a World Wide Name (WWN) to logical volume map 130, and servers S1, S2. Each of the servers S1, S2 has one or more world wide names WWN1, WWN2, WWN4, WWN5 assigned to them. Each of the logical volumes LV1-LV4 has one or more world wide names WWN1-WWN6 associated with them. The world wide name to logical volume map 130 maps the associations between world wide names WWN1-WWN6 and logical volumes LV1-LV4. The map 130 may also include indications as to which logical volumes LV1-LV4 have been associated with servers S1, S2. For example, as will become more evident, logical volumes LV1 and LV4 have been assigned to server S1, logical volumes LV2 and LV4 have been assigned to server S2. Logical volume LV3 has not been assigned to a server.

According to one embodiment, a server administrator determines what their storage criteria will be for a period of time, such as three months. For example, the server administrator can determine how many logical volumes they will be using, how large each of the logical volumes will be, as well as other storage criteria for the logical volumes. The server administrator can determine world wide names that can be associated with each of the logical volumes. For example, the server administrator can determine that the world wide names WWN1, WWN2, WWN3 will be associated with private logical volumes that have respectively 10 gigabytes (GBs), 10 GBs, and 20 GBs. The server administrator can also determine that the world wide names WWN4, WWN5, and WWN6 will be associated with a shared logical volume that has 20 GBs. The server administrator then communicates the determined storage criteria and the world wide names WWN1-WWN6 to a storage administrator. The storage administrator can use the storage criteria to pre-provision the requested logical volumes LV1-LV4 and assign the respective world wide names WWN1-WWN6 to the appropriate logical volumes LV1-LV4 as depicted in FIG. 1.

The servers S1, S2 are not required to have been configured at the time that the logical volumes LV1-LV4 are pre-provisioned with the requested storage criteria and associated with the world wide names WWN1-WWN6. Since the world wide names WWN1-WWN6 are not required to be assigned to the servers S1, S2, the server administrator can use the pre-provisioned logical volumes LV1-LV4 as a pool of storage 110 that logical volumes can be selected from and provisioned to servers S1, S2.

The server administrator can build the servers S1 and S2 and assign world wide names WWN1-WWN6 to the servers S1, S2 as depicted in FIG. 1. For example, WWN1 and WWN4 are assigned to server S1 and WWN2 and WWN5 are assigned to server S2. As depicted in FIG. 1, WWN3 and WWN6 are not assigned to any server. The world wide names are used to determine which logical volumes a server can access. For example, when server S1 is powered on, the world wide names WWN1 and WWN4 stored at server S1 are used to determine that server S1 can access logical volumes LV1 and LV4 since WWN1 and WWN4 are associated respectively with logical volumes LV1 and LV4. Similarly, the world wide names WWN2 and WWN5 stored at server S2 are used to determine that server S2 can access logical volumes LV2 and LV4 since WWN2 and WWN5 are associated respectively with logical volumes LV2 and LV4.

By pre-provisioning the logical volumes LV1-LV4 with world wide names WWN1-WWN6 that can be used to authorize servers S1-S2 to access appropriate storage resources, both the storage administrator and the server administrator can perform their respective tasks on their own domains without requiring either to perform tasks in the other's domain. For example, the storage administrator can configure and maintain storage without having to use server administrator tools and the server administrator can configure and maintain servers without having to use storage administrator tools. Further, the server administrator can build servers S1, S2 without engaging in a multi-phase communication with the storage administrator first requesting boot logical volumes then requesting private logical volumes and so on.

Servers

The servers S1 and S2 can be either physical servers or logical servers. Physical servers can be implemented as blades in a blade enclosure. Fiber Channel Host Bus Adapters (FC HBAs) can be associated with the blades. An FC HBA may be referred to simply as an HBA. According to one embodiment, a world wide name is assigned to a server by storing the world wide name in the server's HBA non-volatile memory (NVRAM). The physical servers can be used to execute logical servers. According to one embodiment, a logical server that executes on a physical server can access the logical volumes that the physical server is allowed to access.

Pools and Provisioning

A storage pool 110 includes the logical volumes LV1-LV4 and a server pool can be used to include the servers S1, S2. The logical volumes LV1-LV4 may be stored on different disk arrays. According to one embodiment, each logical volume is contained within a single disk array. One or more logical volumes LV1-LV4 can be selected from the storage pool 110 and assigned to a server S1, S2 that is selected from the server pool. Logical volumes and servers can be provisioned from their respective pools to create various combinations of servers and logical volumes. The logical volumes and servers can be returned to their respective pools and re-provisioned to create different combinations of servers and logical volumes. The term "provisioning" shall be used herein to include an initial "provisioning," and subsequent "re-provisioning" of the resources. Using WWNs that can be assigned to servers after logical volumes have been created enables efficient and flexible provisioning and re-provisioning of servers and logical volumes to create various combinations of servers and logical volumes. For example, a logical volume that was assigned to one server can be re-provisioned to another server by deleting the assignment of the logical volume from its current server and re-assigning the logical volume to the new server. Various embodiments can be used for provisioning servers with common configurations. For example, assume that a server with two logical volumes and a server with five logical volumes are examples of common configurations that are used by a data center. Various embodiments can be used for provisioning a certain number of servers with two logical volumes and provisioning another number of servers with five logical volumes.

Storage Area Network

According to one embodiment, a Storage Area Network (SAN) is used for communicating between logical volumes LV1-LV4 and servers S1, S2. A storage area network (SAN) that comprises from switches is used for communicating between a server and the logical volumes that have been assigned to it. As will become more evident, by pre-provisioning logical volumes LV1-LV4 according to various embodiments, modifications to the storage area network environment are not required at the time that a server S1, S2 is provisioned.

Logical Volumes

Logical volumes, according to one embodiment, contain private data or shared data. Logical volume LV1 is an example of a logical volume that could be used to include private data since only server S1 can access logical volume LV1 using WWN1. Similarly logical volume LV2 is an example of a logical volume that could be used to include private data since only server S2 could access logical volume LV2 using WWN2. A Logical Unit Number (LUN) can be used to identify a logical volume.

According to one embodiment, shared data is implemented by associating multiple WWNs with a logical volume. Different servers can use different WWNs that were associated with that logical volume to access it. Logical volume LV4 is an example of a logical volume that could be used to include shared data since both servers S1 and S2 could access logical volume LV4. Server S1 could use WWN4 to access logical volume LV4 and server S2 could use WWN5 to access logical volume LV4.

According to one embodiment, a server can access more than one logical volume. For example, referring to FIG. 1, server S1 can access logical volumes LV1 and LV4. Server S2 can access logical volumes LV2 and LV4.

Examples of private data include, among other things, boot data and application data, such as financial data. Boot data can include an image of a host operating system that is read from a logical volume and written to main memory of a server. The server's processor executes the copy of the operating system that has been written to the server's main memory. Application data is used by an application.

World Wide Names

According to one embodiment, World Wide Names (WWNs) are assigned to servers and used to determine whether a server can access a particular logical volume or other storage resources like disk array controller. For example, a world wide name WWN1 that is assigned to server S1 can be associated with a logical volume LV1 and used to determine that server S1 can access logical volume LV1. The world wide names can also be referred to as server initiator WWNs. The WWNs, according to one embodiment, are selected from a range of WWNs that have been assigned to a company, such as a company that manufactures, sells, or buys servers S1, S2 or server FC HBAs. The industry standard Fiber Channel Specification can be used for determining the naming convention of the WWNs.

Another System

Figure 2:
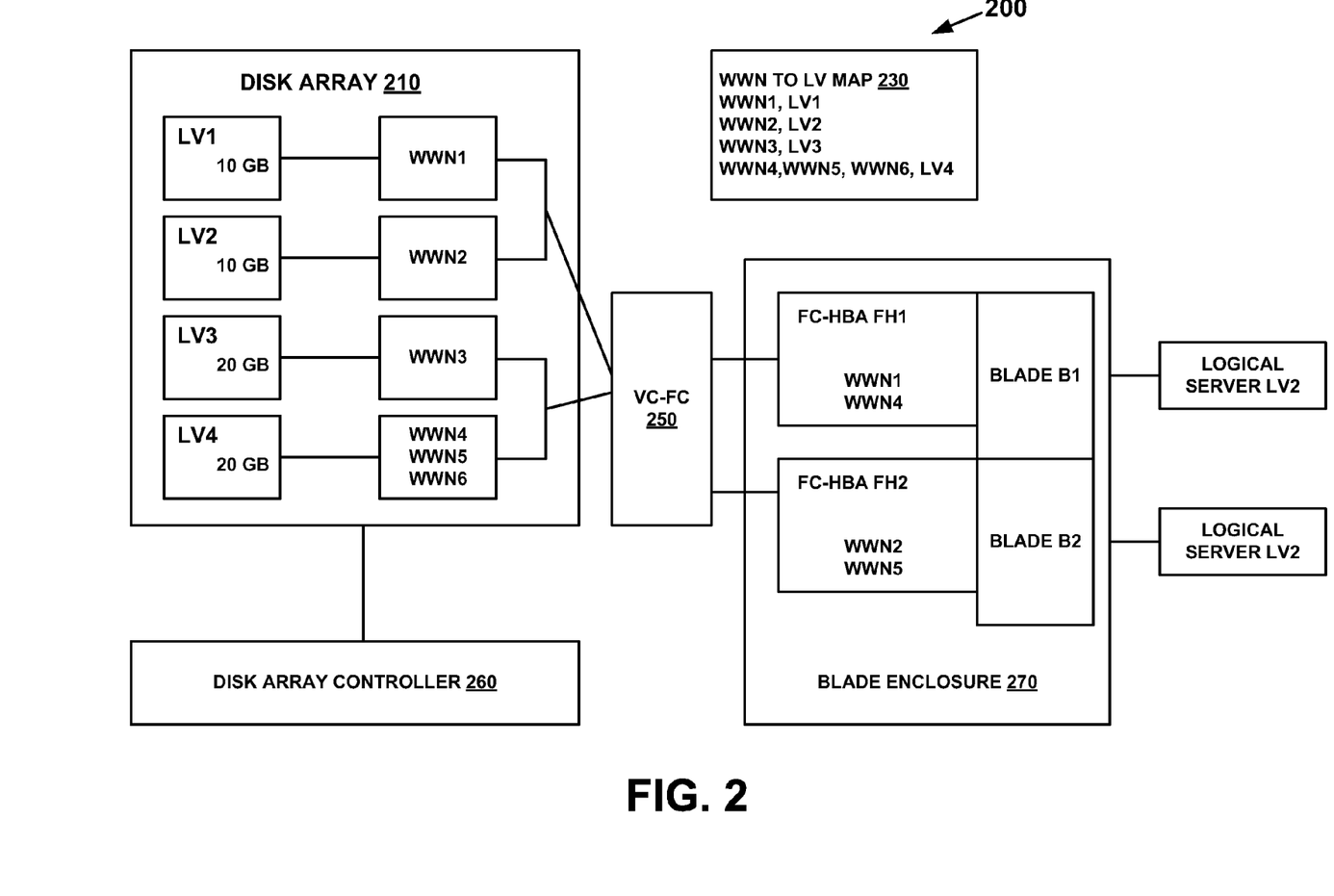
FIG. 2 depicts a block diagram of another system for automating server deployment using a pre-provisioned logical volume, according to another embodiment.

FIG. 2 depicts a block diagram of another system for automating server deployment using a pre-provisioned logical volume, according to another embodiment. The blocks that represent features in FIG. 2 can be arranged differently than as illustrated, and can implement additional or fewer features than what are described herein. Further, the features represented by the blocks in FIG. 2 can be combined in various ways. The system 200 can be implemented using software, hardware, firmware, or a combination thereof.

FIG. 2 depicts a disk array 210 and a server blade enclosure 270. The disk array 210 includes logical volumes LV1 and LV4. A storage pool 110 can include the logical volumes from one or more disk arrays 210, according to one embodiment. The world wide names WWN1-WWN6 are associated with the logical volumes LV1-LV4 in the same manner as depicted in FIG. 1. The server blade enclosure 270 includes server blades B1 and B2 with respective Fiber Channel Host Bus Adapters (FC HBA) FH1 and FH2. The server blades B1 and B2 are examples of physical servers. Logical servers LS1 and LS2 are executed respectively on server blades B1 and B2. A world wide name is assigned to a server by storing it in the FC HBA associated with the server, according to one embodiment. For example, WWN1 and WWN4 are assigned to physical server B1 by storing WWN1 and WWN4 in FH1. As depicted in FIG. 2, WWN1 and WWN4 are assigned to physical server B1 and WWN2 and WWN5 are assigned to physical server B2. Thus, the world wide names WWN1 and WWN4 stored in the FH1 are used to determine that physical server B1 and logical server LS1 can access logical volume LV1 and LV4 since WWN1 and WWN4 are associated respectively with logical volumes LV1 and LV4. Similarly, the world wide names WWN2 and WWN5 stored in the FH2 are used to determine that physical server B2 and logical server LS2 can access logical volumes LV2 and LV4 since WWN2 and WWN5 are associated respectively with logical volumes LV2 and LV4. According to one embodiment, HP™'s Virtual Connect Technology™ is used as a part of assigning and persisting a WWN to an HBA physical port, such as a blade server's physical HBA port FH1 or FH2.

Although system 200 depicts one disk array 210, a system 200 for automating server deployment by pre-provisioning logical volumes, could include more than one disk array, as well each disk array could include more than one disk array controller. System 200 may also include systems 120 and 140 as depicted in FIG. 1.

According to one embodiment, a server can access more than one logical volume. For example, referring to FIG. 2, physical server B1 and logical server LS1 can access logical volumes LV1 and LV4. Physical server B2 and logical server LS2 can access logical volumes LV2 and LV4. According to one embodiment, the multiple WWN's are provisioned to a single physical HBA port thereby creating one or more "virtual" ports. For example, referring to FIG. 2, WWN1 and WWN4 are provisioned to FC HBA FH1 creating virtual ports with access to logical volumes LV1 and LV4. WWN2 and WWN5 are provisioned to FC HBA FH2 creating virtual ports with access to logical volumes LV2 and LV4. Access to the logical volumes can be managed by creating or deleting virtual ports with associated WWNs from a server's physical HBA port. For example, referring to FIG. 2, logical server LS1 can be granted access to logical volume LV1 by configuring FC HBA FH1 with WWN1. According to one embodiment, the HBA's use of NPIV (N-Port ID Virtualization) is extended to enable provisioning of multiple WWNs to a given physical HBA port.

Zones

According to one embodiment, zones are used as a part of implementing private data and limiting server access to disk array controllers. For example, the storage administrator could configure fiber channel zoning on the SAN's fabric switches so that each disk array controller would be placed into an individual zone corresponding with a WWN assigned to a server. The storage administrator could use commonly available tools on the storage devices, such as "Selective Storage Presentation" or "LUN masking," in order to further limit server access to a specific logical volume. The storage administrator could present each logical volume to a specific server's WWN. The result, according to one embodiment, is a "storage pool" of logical volumes which have been pre-provisioned by the storage administrator and that can be used by a server administrator.

World Wide Name to Logical Volume Map

The world wide name (WWN) to logical volume (LV) map 130, 230 is used to map which WWNs have been associated with the logical volumes LV1-LV4. For example, referring to FIGS. 1 and 2, WWN1 is associated with logical volume LV1. WWN2 is associated with logical volume LV2. WWN3 is associated with logical volume LV3. WWN4, WWN5 and WWN6 have been associated with logical volume LV4. A WWN to LV map 120, 230 may also include information indicating which WWNs have been assigned to a server. For example, the WWN to LV map 130, 230 may include information that WWN1, WWN2, WWN4, and WWN5 have been assigned to a server. The WWN to LV map 120, 230 may also include information as to which server a WWN has been assigned to. For example, the WWN to LV map 130 may include information indicating that WWN1 has been assigned to server S1.

Storage Definition

The server administrator defines one or more storage definitions for a server. A single storage definition may include storage criteria for all of the logical volumes that a server will access or there may be separate storage definition each with the storage criteria that is associated with a different logical volume that a server will access. Examples of the storage criteria for a logical volume include, but is not limited to, volume size, RAID level, OS host mode, backup criteria, and as will become more evident, the name of a SAN, such as a purpose-specific SAN. Examples of backup criteria include whether the logical volume would be duplexed (also known as "mirroring").

The storage definitions can be used as a part of determining which logical volumes in the storage pool to provision to the servers with those storage definitions. For example, if a server had a storage definition with 10 GBs for one logical volume and another storage definition with 20 GBs for another logical volume, the storage definitions can be used for selecting one logical volume with 10 GBs and a second logical volume with 20 GBs from the storage pool and assigning those selected logical volumes to the server.

Purpose-Specific SAN

According to one embodiment, storage pools, that logical volumes can be selected from, are created using purpose-specific SANs. Typically purpose-specific SANs include storage that is used for a certain purpose. Examples of purpose-specific SANs are a boot SAN, an application data SAN and a data backup SAN.

According to one embodiment, a logical volume is defined not only in terms of its storage criteria but also in terms of the input/output (I/O) path that would be used for accessing the logical volume. Therefore, other examples of purpose-specific SANs include a purpose specific SAN that enables high performance to an application to performs a lot of writes or a purpose specific SAN that enables high performance to an application that performs a lot of reads.

According to one embodiment, purpose-specific SANS are implemented by associating specific Fiber Channel (FC) assignments to a specific storage pool. This allows a storage administrator to build separate purpose-specific SANs and expose storage pools of pre-presented storage, in the form of logical volumes, from each of the purpose-specific SANs. Purpose-specific SANs enable a server administrator to describe storage definitions for a server which not only specify storage criteria in terms of size, RAID level, OS host mode, backup criteria but also in terms of the name of a purpose-specific SAN from which a logical volume would be selected. At storage allocation time, a logical volume is selected from the storage pool which conforms to a storage definition associated with a server. The WWN associated with a logical volume can be assigned to the server's FC HBA, creating a virtual port to the selected logical volume. At power-up, the server is able to access the presented logical volume on the purpose-specific SAN that it was selected without further storage administrator assistance.

Systems for Automating Server Deployment Using a Pre-Provisioned Logical volume FIG. 1 depicts systems 120, 140 for automating server deployment using a pre-provisioned logical volume. One of the systems is associated with the servers and the other apparatus is associated with the storage pool or the disk array controller. The system 120 that resides at a disk array controller or storage pool comprises a world-wide-name-to-logical-volume-associator 122 (referred to hereinafter as "WWN associator"), a world-wide-name-receiver 124 (referred to hereinafter as "WWN receiver"), and a logical-volume-accessor-enabler 126 (referred to hereinafter as "LV accessor enabler"). The WWN associator 122 is configured for associating a first world wide name with a logical volume associated with a disk array controller. The WWN receiver 124 is configured for receiving at the disk array controller a second world wide name that is assigned to a server. The LV accessor 126 enabler is configured for enabling the server to access the logical volume if the first world wide name is the same as the second world wide name, wherein the first and second world wide names are not required to be assigned to any server at the time that the first world wide name was associated with the logical volume. The system 120 also includes a computer readable storage medium where instructions that implement the WWN associator 122, the WWN receiver 124, and the LV accessor enabler 126 reside. The system 120 also includes a processor for executing the instructions that are stored on the computer readable storage medium.

The system 140 that resides at the servers S1, S2 comprises a world-wide-name-to-server-assignor 142 (referred to herein as "WWN assignor"), a world-wide-name-communicator 144 (referred to herein as a "WWN communicator"), and a logical-volume-accessor 146 (referred to herein as a "LV accessor"). The WWN assignor 142 is configured for assigning the second world wide name to the server S1, S2. The WWN communicator 144 is configured for communicating the second world wide name from the server S1, S2 to a disk array controller. The LV accessor 146 is configured for accessing a logical volume associated with the disk array controller if the second world wide name is the same as a first world wide name that is associated with the logical volume, wherein the first and second world wide names are not required to be assigned to any server at the time that the first world wide name was associated with the logical volume. The system 140 also includes a computer readable storage medium where instructions that implement the WWN assignor 142, the WWN communicator 144 and the LV accessor 146 reside. The system 140 also includes a processor for executing the instructions that are stored on the computer readable storage medium.

Figure 3:
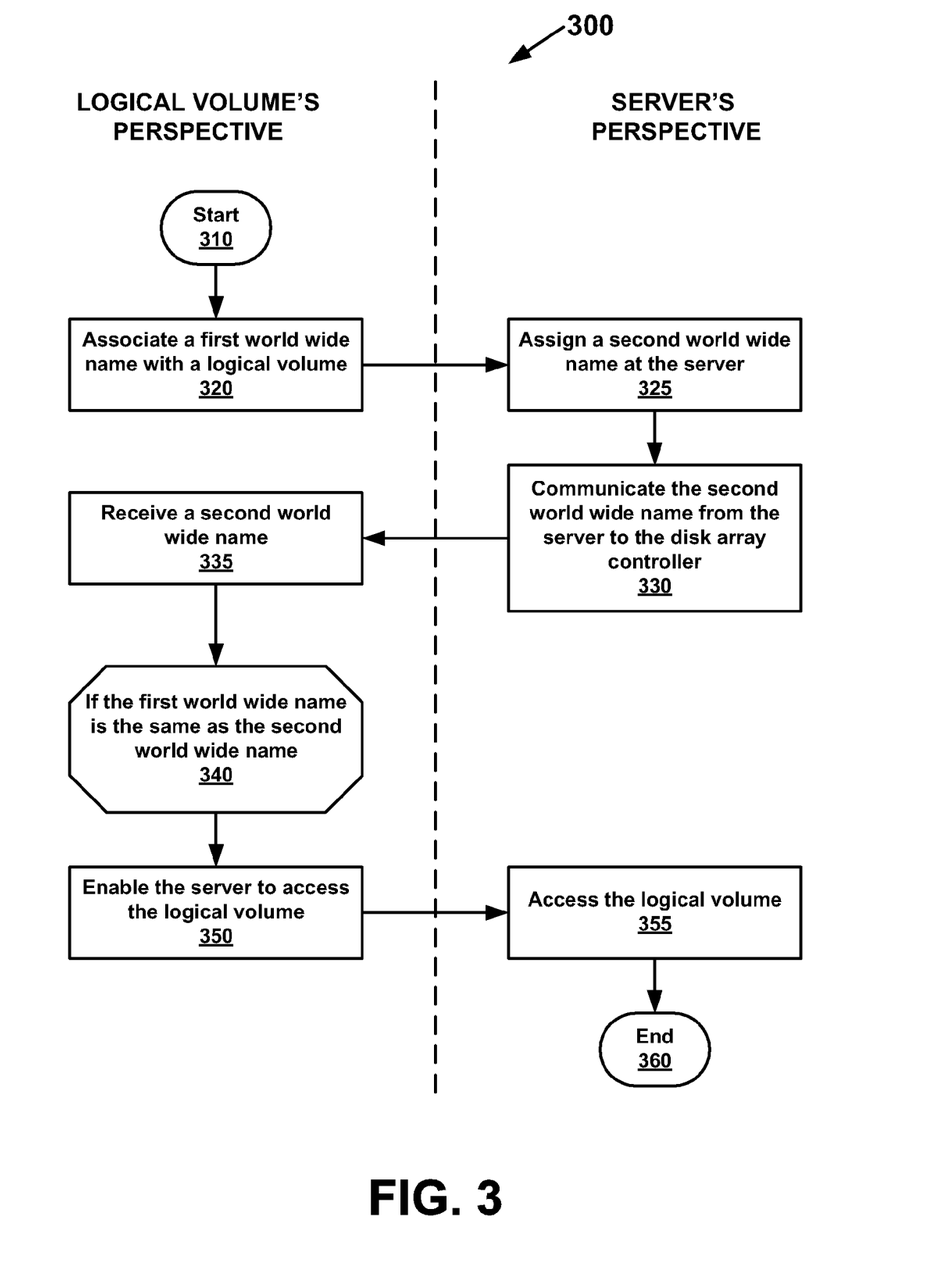
FIG. 3 depicts a flowchart for automating server deployment using a pre-provisioned logical volume, according to one embodiment.

Illustration of a Method of Automating Server Deployment Using a Pre-Provisioned Logical Volume FIG. 3 depicts a flowchart 300 for automating server deployment using a pre-provisioned logical volume, according to one embodiment. Although specific operations are disclosed in flowchart 300, such operations are exemplary. That is, embodiments of the present invention are well suited to performing various other operations or variations of the operations recited in flowchart 300. It is appreciated that the operations in flowchart 300 may be performed in an order different than presented, and that not all of the operations in flowchart 300 may be performed.

The flowchart 300 depicts operations 320, 330, 340, 350 that are performed from a logical volumes perspective, for example, by an apparatus that is associated with a disk array controller. The flowchart 300 also depicts operations 325, 335, 335 that are performed from a server's perspective.

The following description of flowchart 300 refers to FIG. 2.

The method begins at 310, according to one embodiment. At 320 (LV), the first world wide name is associated with a logical volume that is associated with a disk array controller, according to one embodiment. For example, the WWN associator 122 associates a first world wide name WWN1 with a logical volume LV1 that is associated with a disk array's controller 260.

According to one embodiment, at some later point in time, a second world wide name is assigned to a server. For example, the WWN assignor 142 can store the world wide name WWN1 in an FC-HBA FH1 associated with a physical server B1 that server LS1 executes on. Note that according to one embodiment neither the first nor the second world wide names are required to be assigned to any server B1, B2, LS1, LS2 at the time that the first world wide name WWN1 was associated with the logical volume LV1.

The second world wide name is communicated 330 (S) from the server to the disk array's controller, according to one embodiment. For example, a WWN communicator 144 communicates the second world wide name WWN1 from the server B1 to the disk array's controller 260.

The disk array controller receives 335 (LV) the second world wide name that was assigned to the server at 325, according to one embodiment. For example, the WWN receiver 124 receives the second world wide name WWN1 that the WWN communicator 144 communicated from the server B1 to the disk array controller 260 at 330.

A determination 340 (LV) is made as to whether the first world wide name WWN1 is the same as the second world side name WWN1. For example, the LV accessor enabler 126 can compare the first world wide name WWN1, which was associated with the logical volume LV1 at 320, to the second world wide name WWN1, which was assigned to the server B1 at 325. The WWN accessor enabler 126 can enable the server B1 to access 355 (S) the logical volume LV1 if the first world wide name WWN1, which was associated with the logical volume LV1 at 320, and second world wide name WWN1, which was assigned to the server B1 at 325, are the same. If the physical server B1 can access logical volume LV1, then according to one embodiment, logical server LS1, which executes on physical server B1, can also access logical volume LV1. However, according to one embodiment, server B1 is denied access to logical volumes LV2 or LV3 since none of server B1's world wide names WWN1 and WWN4 are the same as the world wide names WWN2, WWN3 associated with logical volumes LV2 and LV3.

The method ends at 360.

The operations 310-360 can be used to implement private data or shared data. For example, the operations 310-360 can configure a system 200 so that only server B1 can access data associated with logical volume LV1. Similarly, the operations 310-360 can configure a system 200 so that only a server B2 can access data associated with a logical volume LV2. The private data may be boot data or some other type of data such as application data or backup data. The operations 310-360 can be used to configure a system 200 so that a server can access boot data on a logical volume in order to boot. The operations 310-360 can also be used to configure the system 200 so that an application executing on the server can access application data on a logical volume. The system 200 can be configured first using operations 310-360 so that a server can access boot data in order to boot and then after the server boots successfully, the system 200 can be configured again using operations 310-360 so that an application executing on the server can access application data on another logical volume.

The operations 310-360 can be used to implement shared data. For example, operations 310-360 can be used to grant server B1 access to logical volume LV4 using WWN4. The operations 310-360 can also be used to grant server B2 access to the same logical volume LV4 using WWN5 thus servers B1 and B2 can share data that is stored on logical volume LV4.

Computer Readable Storage Medium

Any one or more of the embodiments described herein can be implemented using computer readable storage medium and computer-executable instructions which reside, for example, in computer-readable medium of a computer system or like device. The computer readable storage medium can be any kind of memory that instructions can be stored on. Examples of the computer readable storage medium include but are not limited to a disk, a compact disk (CD), a digital versatile device (DVD), read only memory (ROM), flash, and so on. As described above, certain processes and steps of embodiments of the present invention are realized, in one embodiment, as a series of instructions (e.g., software program) that reside within computer readable storage memory of a computer system and are executed by the processor of the computer system. When executed, the instructions cause the computer system to implement the functionality of the embodiments of the present invention.

CONCLUSION

By pre-provisioning the logical volumes LV1-LV4 with world wide names WWN1-WWN6 that can be used to authorize servers S1-S2 to access appropriate volumes, both the storage administrator and the server administrator can perform their respective tasks on their own domains without requiring either to perform tasks in the other's domain. For example, the storage administrator can configure and maintain storage without having to use server administrator tools and the server administrator can configure and maintain servers without having to use storage administrator tools. Second, the server administrator can build servers without engaging in a multi-phase communication with the storage administrator first requesting boot logical volumes then requesting private logical volumes and so on. Third, by pre-provisioning logical volumes according to various embodiments, modifications to the storage area network environment are not required at the time that a server is provisioned.

Various embodiments also provide for provisioning multiple WWNs to a single physical HBA, independence of the server administrator from the storage administrator during the process of provisioning a server, the ability to sequence the presentation of boot storage and data storage thereby avoiding the unpredictable default behavior of an OS vendor's provisioning tools, eliminating the disabling of secondary boot path thus eliminating the manual operation of provisioning a server, the ability to add storage resources to an existing server without interacting with a storage administrator, the ability to reclaim storage resources when a server is de-provisioned without an interaction with the storage administrator, the ability to change the storage definition for a new server "on-the-fly" via an automated process, independence from a vendor specific SAN fabric infrastructure since, according to one embodiment, any fiber channel switch which supports NPIV can be used and hence functionality may be directly integrated with existing data center SANs shared and private data, the ability to use purpose-specific SANs thus enabling a greater degree of control over the type of storage resource that is being made available while still maintaining server administrator independence at server provisioning time, easy integration with existing SANs and data center processes, and the ability of the server administrator to rapidly and independently provision and re-provision SAN attached physical servers.

What is claimed is:

1. A method of automating server deployment using a pre-provisioned logical volume, the method comprising:
    associating a first world wide name with a logical volume associated with a disk array controller;
    receiving at the disk array controller a second world wide name that is assigned to a server; and
    if the first world wide name is the same as the second world wide name, enabling the server to access the logical volume, wherein the first and second world wide names are not required to be assigned to any server at the time that the first world wide name is associated with the logical volume.

2. The method as recited by claim 1, wherein the method further comprises:
    associating a third world wide name with the logical volume;
    receiving a fourth world wide name that is assigned to a second server; and
    if the third world wide name is the same as the fourth world wide name, enabling the second server to access the logical volume, wherein the third and fourth world wide names are not required to be assigned to any server at the time the third world wide name is associated with the logical volume.

3. The method as recited by claim 1, wherein the method further comprises:
    configuring the logical volume to include private data by not associating any other world wide names with the logical volume other than the first world wide name.

4. The method as recited by claim 1, wherein the method further comprises:
    selecting the logical volume from a purpose-specific storage area network (SAN); and
    provisioning the logical volume to the server by assigning the first world wide name to the server.

5. A system for automating server deployment using a pre-provisioned logical volume, the system comprising:
    a processor for executing instructions;
    a non-transitory computer readable storage medium that the instructions are stored on, wherein the instructions implement
        a world-wide-name-to-server-assignor configured for assigning a first world wide name to a server;
        a world-wide-name-communicator configured for communicating the first world wide name from the server to a disk array controller;
        a logical-volume-accessor configured for accessing a logical volume associated with the disk array controller if the first world wide name is the same as a second world wide name that is associated with the logical volume wherein the first and second world wide names are not required to be assigned to any server at the time that the first world wide name is associated with the logical volume.

6. The system of claim 5, further comprising:
    a world-wide-name-to-logical-volume-associator configured for associating the first world wide name with the logical volume associated with the disk array controller;
    a world-wide-name-receiver configured for receiving at the disk array controller the second world wide name that is assigned to the server; and
    a logical-volume-accessor-enabler configured for enabling the server to access the logical volume if the first world wide name is the same as the second world wide name.

7. The system of claim 5, wherein the method further comprises:
    a world-wide-name-to-logical-volume-associator configured for associating a third world wide name with the logical volume;
    a world-wide-name-receiver configured for receiving a fourth world wide name that is assigned to a second server; and
    a logical-volume-accessor-enabler configured for enabling the second server to access the logical volume if the third world wide name is the same as the fourth world wide name, wherein the third and fourth world wide names are not required to be assigned to any server at the time the third world wide name is associated with the logical volume.

8. The system of claim 5, wherein the second world wide name is assigned to the server by storing the second world wide name in a Host Bus Adapter (HBA) associated with the server.

9. The system of claim 5, wherein storage criteria for the logical volume is selected from a group of a size for the logical volume, RAID level for the logical volume, operating system (OS) host mode of the logical volume, backup criteria of the logical volume, and name of a storage area network (SAN) for the logical volume.

10. A non-transitory computer readable storage medium having computer-readable program instructions stored thereon for causing a computer system to perform a method of automating server deployment using a pre-provisioned logical volume, the method comprising:
    assigning a first world wide name to a server;
    communicating the first world wide name from the server to a disk array controller;
    accessing a logical volume associated with the disk array controller if the first world wide name is the same as a second world wide name that is associated with the logical volume, wherein the first and second world wide names are not required to be assigned to any server at the time that the first world wide name is associated with the logical volume.

11. The non-transitory computer readable storage medium of claim 10, wherein the assigning of the first world wide name to the server further comprises:

storing the first world wide name in a Host Bus Adapter (HBA) associated with the server.

12. The non-transitory computer readable storage medium of claim 10, wherein the method further comprises:

selecting the logical volume for provisioning to the server based storage criteria of the logical volume matching storage criteria of a storage definition associated with the server.

13. The non-transitory computer readable storage medium of claim 10, wherein storage criteria for the logical volume is selected from a group of a size for the logical volume, RAID level for the logical volume, operating system (OS) host mode of the logical volume, backup criteria of the logical volume, and name of a purpose-specific storage area network (SAN) that the logical volume is associated with.

14. The non-transitory computer readable storage medium of claim 10, wherein the method further comprises:

associating a third world wide name with the logical volume;

receiving a fourth world wide name that is assigned to a second server; and enabling the second server to access the logical volume if the third world wide name is the same as the fourth world wide name, wherein the third and fourth world wide names are not required to be assigned to any server at the time the third world wide name is associated with the logical volume.

15. The non-transitory computer readable storage medium of claim 10, wherein the method further comprises:

associating the first world wide name with the logical volume associated with the disk array controller;

receiving at the disk array controller the second world wide name that is assigned to the server; and enabling the server to access the logical volume if the first world wide name is the same as the second world wide name.

* * * * *